(12) United States Patent
Jia

(10) Patent No.: US 7,953,684 B2
(45) Date of Patent: May 31, 2011

(54) METHOD AND SYSTEM FOR OPTIMAL PARALLEL COMPUTING PERFORMANCE

(75) Inventor: Bin Jia, North Bergen, NJ (US)

(73) Assignee: International Business Machines Corporation, Armonk, NY (US)

( * ) Notice: Subject to any disclaimer, the term of this patent is extended or adjusted under 35 U.S.C. 154(b) by 1126 days.

(21) Appl. No.: 11/669,600

(22) Filed: Jan. 31, 2007

(65) Prior Publication Data

US 2008/0183779 A1 Jul. 31, 2008

(51) Int. Cl.
*G06N 5/00* (2006.01)
(52) U.S. Cl. .......................... 706/45; 712/28
(58) Field of Classification Search .............. 706/45; 712/28
See application file for complete search history.

(56) References Cited

U.S. PATENT DOCUMENTS

| | | | |
|---|---|---|---|
| 6,212,617 | B1 | 4/2001 | Hardwick |
| 6,601,089 | B1 | 7/2003 | Sistare et al. |
| 6,751,791 | B2 | 6/2004 | Inaba |
| 6,766,517 | B1 | 7/2004 | Bernardo |
| 6,886,031 | B2 | 4/2005 | Venkatsubramanian et al. |
| 2003/0204570 | A1 | 10/2003 | Rehof et al. |
| 2004/0073590 | A1 | 4/2004 | Bhanot et al. |
| 2004/0103218 | A1 | 5/2004 | Blumrich et al. |
| 2005/0091334 | A1 | 4/2005 | Chen et al. |

OTHER PUBLICATIONS

"Optimization of Collective Communication Operations in MPICH", R. Thakur, R. Rabenseifner, W. Gropp, The International Journal of High Performance Computing Applications, vol. 19, No. 1, Spring 2005, pp. 49-66.*
"All-to-All Personalized Communication in Multidimensional Torus and Mesh Networks", Young-Joo Suh, K. G. Shin, IEEE Transactions on Parallel and Distributed Systems, vol. 12, No. 1, Jan. 2001, pp. 38-59.*
"Improving the Performance of Collective Operations in MPICH", R. Thakur, W. D. Gropp, Lecture Notes in Computer Science, vol. 2840, 2003, pp. 257-267.*
"Optimization of Collective Reduction Operations", R. Rabenseifner, ICCS 2004, Lecture Notes in Computer Science 3036, pp. 1-9.*
"More Efficient Reduction Algorithms for Non-Power-of-Two Number of Processors in Message-Passing Parallell Systems", R. Rabenseifner, J. L. Traff, Lecture Notes in Computer Science, vol. 3241, 2004 pp. 309-335.*
Gorlatch, Sergel: "Toward Formally-Based Design of Message Passing Programs", IEEE Transactions of Software Engineering, vol. 26, No. 3, (Mar. 2000), pp. 276-288.
Rabenselfner, et al; "Optimization of MPI_Allreduce and MPI_Reduce": CUG 2004, pp. 1-10, May 17-21, 2004.

* cited by examiner

*Primary Examiner* — Donald Sparks
*Assistant Examiner* — Mai T Tran
(74) *Attorney, Agent, or Firm* — Matthew W. Baca; Ann V. Dougherty

(57) ABSTRACT

A system and method that optimizes reduce operations by consolidating the operation into a limited number of participating processes and then distributing the results back to all processes to optimize large message global reduce operations on non power-of-two processes. The method divides a group of processes into subgroups, performs paired exchange and local reduce operations at some of the processes to obtain half vectors of partial reduce results, consolidates partial reduce results into a set of regaining processes, performs successive recursive halving and recursive doubling at a set of remaining processes until each process in the set of remaining process has a half vector of the complete result, and provides a full complete result at every process.

6 Claims, 4 Drawing Sheets

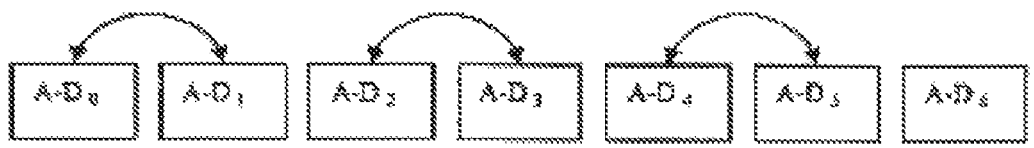
Fig. 1A
Fig. 1B
Fig. 1C
Fig. 1D
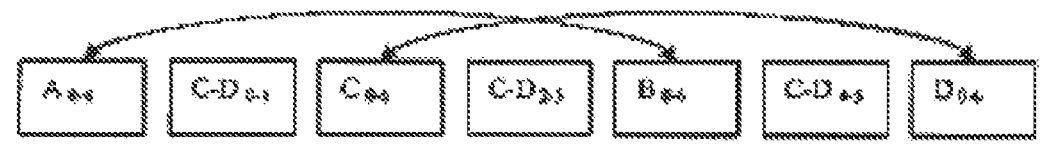
Fig. 1E
Fig. 1F
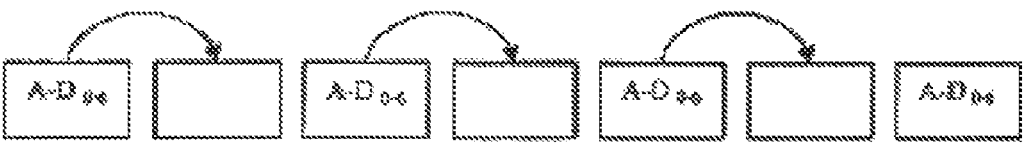
Fig. 1G
FIG. 1
--PRIOR ART--

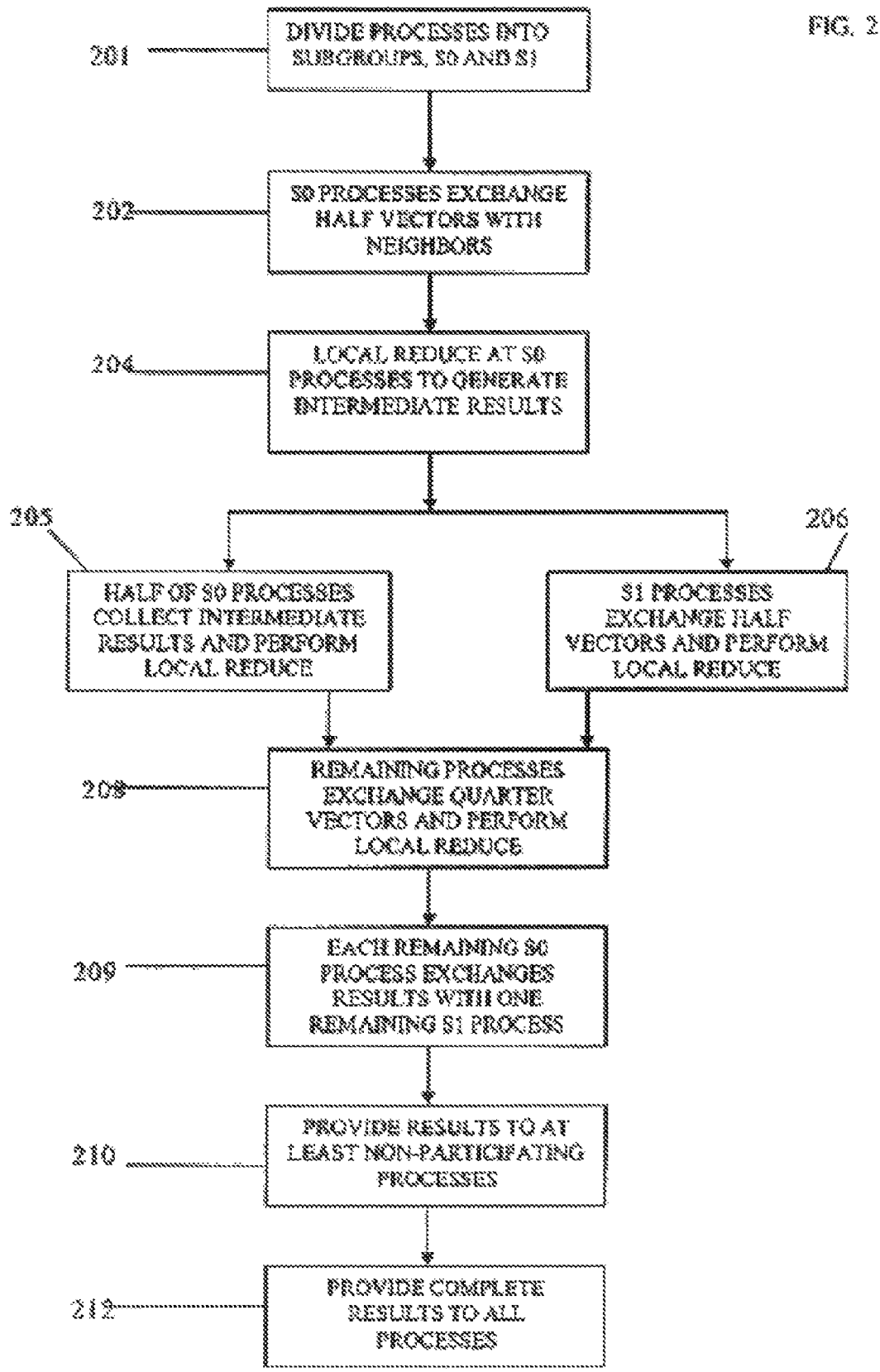

Fig. 3A
Fig. 3B
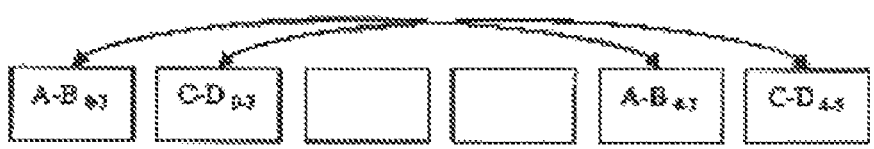
Fig. 3C
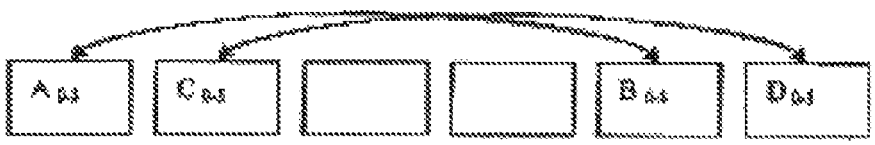
Fig. 3D
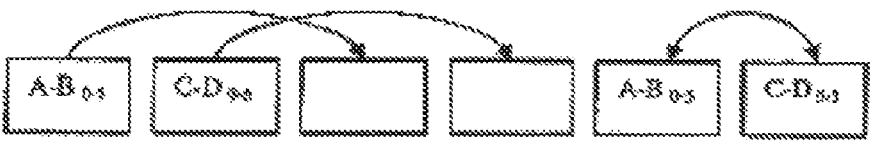
Fig. 3E
Fig. 3F
FIG. 3

PIG. 4

METHOD AND SYSTEM FOR OPTIMAL PARALLEL COMPUTING PERFORMANCE

FIELD OF THE INVENTION

The invention relates to parallel computing and more particularly to a method and system for optimizing the large vector global reduce operation among non power-of-two processes to enhance parallel computing performance.

BACKGROUND OF THE INVENTION

In parallel computing, the global reduce operation is widely used for parallel applications. Data are selectively shared among processes in a group to minimize the communications being exchanged among the processes. The Message Passing Interface (MPI) standard defines several collective interfaces for the reduce operation, most notably MPI_REDUCE and MPI_ALLREDUCE. The global reduce operations could be expensive; therefore, efficient MPI_REDUCE and MPI_ALLREDUCE are important. One long-term profiling study demonstrated that the time spent by parallel applications in performing MPI_REDUCE and MPI_ALLREDUCE operations accounted for more than 40% of the time that the applications spent in all MPI functions.

A global reduce operation is collectively performed across all members (i.e., all processes) of a process group defined by the MPI communicator. For purposes of the instant invention, commutative reduce operations, which are most widely used, will be detailed. In a communicator group, each process has an equal length input vector of data. The global reduce operation combines all input vectors using the specified operation. Processes exchange data and perform local reduce operations to yield partial reduce results. Partial reduce results are exchanged and combined until complete reduce results are generated. In MPI_REDUCE, the full vector with the complete reduce result for the reduce operation returns at one process, known as the root. In MPI_ALLREDUCE, complete reduce results return at every process of the communicator group.

For a small message MPI_REDUCE the best known algorithm is the Minimum Spanning Tree (MST) algorithm in which the root of the MPI_REDUCE is the root of a process MST. A process on the tree first receives messages containing vectors from all of its children and then combines the received data with its own input vector. The process then sends the result vector to its parent process. In MPI_ALLREDUCE, one process is selected as the root. Once the root receives and combines vectors and gets the final result, it broadcasts the result to other member of the communicator group. The cost of the MST MPI_REDUCE algorithm can be modeled by the following if the MST is a binomial tree:

$$T=\log(N)*(\alpha+L*\beta+L*\gamma),$$

where;
α is the latency of each message
β is the communication cost per byte
γ is the local reduce cost per byte
N is the number of process is the communicator; and
L is the length of a process's input vector to the reduce operation.

Clearly for large messages, the MST algorithm is not efficient since every processor would have to perform the reduce operation on full vectors all the time, rather then taking advantage of the parallelism. Better algorithms have been developed for large message MPI_REDUCE and MPI_ALL-REDUCE operations. One such algorithm is the Recursive Halving Recursive Doubling (RHRD) algorithm. In the RHRD algorithm for MPI_REDUCE, each process takes log (N) steps of computation and communication. The computation stage of the steps is preceded by a distribution stage during which the processes exchange data (i.e., vector information) with other processes. In the first step of the distribution stage, also referred to as the preparation stage, process i exchanges with process j half of their input vectors where j=(i ^ mask). Symbol ^ denotes a bitwise exclusive "OR" operation, and "mask" equals 1's binary representation. If i<j, process j sends the first half of its vector to process i and receives the second half of process i's vector. Process i combines the first half of the two vectors and process j combines the second half of the two vectors.

In the second step, process i and process j exchange half of their intermediate reduce results from the first step and combine the received data with the half that was not sent, where j=i ^ mask and mask is 1's binary representation left-shifting 1 bit. At step k, process i and process j exchange half of their intermediate reduce results from step (k−1), and combine the received part with the half that was not sent, where j=i ^ mask and mask is 1's binary representation left shifting (k−1) bits, if i<j, process i sends the second half of the intermediate result and receives the first half.

This procedure continues recursively, halving the size of exchanged and combined data at each step, for a total of log(N) steps. Each process owns 1/N of the result vector in the end: process 0 owns the first 1/N, process 1 owns the second 1/N, process i owns the (i−1)th 1/N and so on. In MPI_REDUCE, the root then performs a gather operation to gather the rest of the complete reduce results back from other processes. The vectors are exchanged between processes by passing messages. Clearly the larger the vector, the larger the message and the higher the overhead and the greater the potential latency for message exchange.

In MPI_ALLREDUCE, an allgather step is performed instead of a gather step, in which every process gathers the complete reduce results from other processes. The cost of the RHRD algorithm can be modeled by:

$$T=2*\log(N)*\alpha+2*(N-1)/N*L*\beta+(N-1)/N*L*\gamma.$$

When the message size is large based on the larger vector length, the RHRD algorithm performs better than the MST algorithm, since the latency term "α" is small compared to the size of the other two terms in the algorithm and can essentially be ignored.

The RHRD algorithm applies only to "power of two" processes. Studies have shown that a reduce operation is widely performed on non-power of two processes as well. For non-power of two N' processes, the prior art solution performs one extra preparation step at the beginning of the operation than the RHRD algorithm. In addition, for the MPI_ALLREDUCE case, another extra step is performed at the end of the operation. The beginning step is to exclude r processes from the algorithm, where r=N'−N, with N being the largest power of two less than N'. The first 2*r processes exchange input vectors. Of the first 2*r processes, those with even ranks send the second half of their vectors to their right neighbors and those with odd ranks send the first half of their vectors to their left neighbors. Once the exchange of vector information is completed, the first 2*r processes perform a local reduce operation. Those with odd ranks then send their local reduce results to their left neighbors and do not participate in the rest the algorithm. Other processes, N of them, follow the algorithm described previously for power of two processes. In MPI_ALLREDUCE, those processes excluded by the first step receive final results from their left neighbors in the final step.

FIG. 1 shows the prior art process flow for an MPI_ALL-REDUCE operation on seven (i.e., a non-power of two) processes, assuming a large vector of size 4, containing elements ABCD. Partial reduce operation results are represented by element and rank number (in subscript), e.g., $A\text{-}B_{0\text{-}3}$ represents reduce results of element A-B of processes 0, 1, 2, and 3.

The cost of the prior art approach on non-power of two processes can be modeled by:

$$T=(2+2*\log(N))*\alpha+(1+2*(N-1)/N)*L*\beta+(\frac{1}{2}+(N-1)/N)*L*\gamma. \quad (1)$$

for MPI_REDUCE and $$T=(3+2*\log(N))*\alpha+(2+2*(N-1)/N)*L*\beta+(\frac{1}{2}+(N-1)/N)*L*\gamma. \quad (2)$$

for MPI_ALLREDUCE.

The extra step or steps for non-power of two processes increase bandwidth requirements by more than 50% for MPI_REDUCE and 100% for MPI_ALLREDUCE. Clearly, therefore, it is desirable, and an object of the present invention, to provide an improved method of performing large message MPI_REDUCE/MPI_ALLREDUCE operations for non-power of two processes.

It is another object of the present invention to improve performance of large message MPI_REDUCE and MPI_ALLREDUCE operations by removing unnecessary data forwarding in the preparation step of the prior art algorithm.

Yet another object is to fully utilize interconnect bandwidth in the final step for MPI_ALLREDUCE by rearranging the flow of partial reduce results.

SUMMARY OF THE INVENTION

The foregoing and other objects are realized by the inventive system and method that optimizes reduce operations by consolidating the operation into a limited number of participating processes and then distributing the results back to all processes to optimize large message reduce operations on non power-of-two processes.

The method comprises the steps of dividing a group of processes into two subgroups, S0 and S1, performing paired exchange and local reduce operations at the processes in S0, such that each process in S0 gets a half vector of partial reduce results; consolidating the partial reduce results into a set of remaining processes, said set excluding a subset of processes, such that only power-of-two processes with a half vector of the partial results comprise the set of remaining processes; performing successive recursive halving and recursive doubling at the set of remaining processes until each process in the set of remaining process has a half vector of the complete result; and providing a full complete result at every process.

BRIEF DESCRIPTION OF THE DRAWINGS

The invention will now be described in greater detail with reference to the appended drawings wherein:

FIG. 1 illustrates the exchange of information among processes for an MPI_ALLREDUCE operation on seven processes using the prior art RHRD algorithm;

FIG. 2 is a flow diagram illustrating the present invention;

FIGS. 3A through 3F illustrate the exchange of information among processes for a large message global reduce operation on an even, power-of-two number of processes, specifically six processes, in accordance with the present invention.

DETAILED DESCRIPTION OF THE INVENTION

Figure 4A:
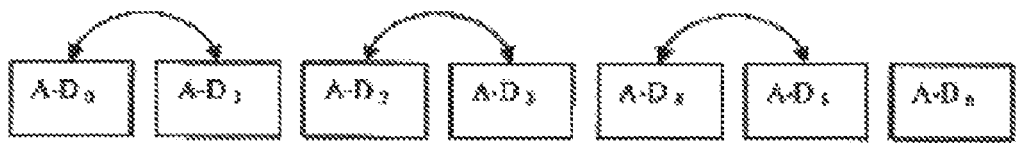
FIGS. 4A through 4F illustrate the exchange of information among processes for a large message global reduce operation on an odd, non power-of-two number of processes, specifically seven processes, in accordance with the present invention.

In accordance with the invention, in a first step, 201 of FIG. 2, the group of processes, with each process each having an input vector comprising a number of data elements, is divided into two subgroups. Subgroup S0 consists of processes 0, 1, ..., **2*r−1, where r=N'−N, with N being the largest power of two less than N'. The rest of the processes belong to subgroup S1**. From the way the subgroups are divided, it is known that:

--- if r is even, S1 has an even number of processes.
   Proof: r = N' − N. If r is even, N' must be even
   since N is power of two. The number of processes in
   S1 is N' − 2 * r which must be even since both N' and
   2*r are even.
if r is odd, S1 has an odd number of processes.
   Proof: r = N' − N. If r is odd, N' is also odd since N
   is power of two. Therefore N' − 2 * r must be odd
   since N' is odd while 2*r is even.

---

Once the subgroups have been established, each process i of subgroup S0 exchanges half of its vector, comprising half of the data elements of the input vector, with process i+1 if i is even, or process i−1 if i is odd, during the preparation phase at step 202. Local reduce operations are performed on the half vectors at all of the S0 subgroup processes at step 203. Results of the local reduce operation are not, however, sent by processes with odd ranks to processes with even ranks, as had been done in the prior art processing.

Rather, at this point in the reduce operation, the subgrouping of processes dictates the computation and communication behavior of each process. Accordingly, the half vectors of the partial reduce results are consolidated into a set of remaining processes, where the set comprises X processes with X being a power-of-two integer and wherein the set comprises a plurality of processes from S0 and at least one process from S0.

If r is even, processes of S0 can be further organized into r/2 4-process subgroups ((4*i, 4*i+1, 4*i+2, 4*i+3)|i=0, 1, ..., r/2−1). In each of the 4-process subgroups, process 4*i+2 sends its local reduce result to process 4*i. Process 4*i+3 sends its local reduce result to process 4*i+1. Process 4*i and process 4*i+1 perform local reduce operation on the received intermediate results and its own local reduce results at step 205 and move on to the next step. Process 4*i+2 and process 4*i+3, hereinafter referred to as the non-participating processes, are excluded from the next steps of the global reduce. Each process i of subgroup S1 exchanges half of its input vector with process i+1 if i is even, or process i−1 if i is odd, and performs local reduce operation at step 207. After this step, the remaining subset of processes, each with a half vector of a partial reduce results, participate in step 208, carrying out recursive halving until each gets (1/N)th of the complete result vector. Then the remaining set of processes perform the recursive doubling at step 209, such that for MPI_ALLREDUCE, each gets a half vector of the complete reduce result, or for MPI_REDUCE, two remaining processes, including the root, each gets a half vector of the complete result. For MPI_REDUCE, the full complete results can be provided to one process in one final step in which the other remaining process sends its half vector to the root. For MPI_ALLREDUCE, exchange of half vector results can then be done in successive steps, 210 and 212 to ensure that complete vector results are available at every process. At step 210, remaining processes that belong to S0, send their half results to the non-participating processes of S0: process **4*i sends to process 4*i+2, and process 4*i+1 sends to process 4*i+3, i=0, 1, . . . , r/2−1. Process i and i−1 of S1** exchange their results, i=2*r, 2*(r+1), . . . , N'−2. After step 210, each process in S0 has a half vector of the complete result and each process in S1 gets the full complete result. Finally, at step 212, processes in S0 perform an exchange, similar to what processes in S1 did at step 210, to get the full complete results.

FIGS. 3A through 3F illustrate the six processes, referred to as processes 0 through 5, performing the reduce operation detailed above. Process 0 has vector A-$D_0$, process 1 has vector A-$D_1$, process 2 has vector A-$D_2$, process 3 has vector A-$D_3$, process 4 has vector A-$D_4$, and process 5 has vector A-$D_5$. The processes are divided into subgroups S0 and S1 where S0 has processes 0, 1, . . . **2*r−1 and S1 has the rest of the processes. In this example, S0 comprises processes 0, 1, 2 and 3 and S1 comprises processes 4 and 5**.

In FIG. 3A, the first 4 processes of subgroup S0 exchange half of the vector with their neighbors and perform the local reduce operations. The subgroup S1 processes 4 and 5 are idle in this step. In FIG. 3B, process 2 sends its local reduce result to process 0 and process 3 sends its local reduce result to process 1. Process 4 and 5 exchange half vectors and perform local reduce operations at this point. For the next few steps, processes 2 and 3 will be idle, referred to as "non-participating processes" and processes 0, 1, 4 and 5 are active and are referred to as the subset of "remaining processes."

At FIG. 3C, processes 0 and 1 of subgroup S0 exchange a quarter of the vector with processes 4 and 5 of subgroup S1. Specifically, process 0 exchanges with process 4, since each contains partial results for A-B, while process 1 exchanges with process 5 since each has partial results for C-D. Thereafter, processes 0, 1, 4 and 5 perform local reduce operations, resulting in each remaining process having complete results for a quarter vector as shown in FIG. 3D. Each remaining process then exchanges complete quarter vector results with one other remaining process, whereby, as illustrated in FIG. 3E, processes 0 and 4 would have complete results for half vector A-B and processes 1 and 5 would have complete results for half vector C-D. It is to be noted that there is not a necessary pairing of processes for the exchange of quarter vector results; however, exchange between contiguous buffers will incur the least overhead. Half vector results are sent from process 0 to process 2, from process 1 to process 3, and exchanged between process 4 and process 5 as shown by the arrows in FIG. 3E. Finally, half vectors are exchanged between processes 0 and 1 and between processes 2 and 3 so that all processes have complete vector results as shown in FIG. 3F.

If r is odd, the first 2*(r−1) processes of S0 can be organized into (r−1)/2 4-process subgroups, while the last two processes **2*r−2, 2*r−1 of S0 are regrouped into a subset with process 2*r, the first process of S1. Processes of subgroup S0, except for process 2*r−2 and 2*r−1, behave the same as in the case when r is even. Processes of subgroup S1, except for process 2*r, also behave the same as in the case when r is even. Process 2*r−1 of subgroup S1 sends its local reduce result to process 2*r. While receiving from process 2*r−1, process 2*r also sends the first half of its input vector to process 2*r−2**.

Process **2*r−2 and process 2*r then perform local reduce operations and move on to the next step. Process 2*r−1** is excluded from the rest of the global reduce as are the other non-participating processes.

Again, after this step, the remaining processes in the subset each have half vector partial reduce results and participate in the step 208 of recursive halving and steps 209 of recursive doubling, resulting in each process getting a half vector of the complete reduce results for MPI_ALLREDUCE, or in two regaining processes, including the root, each getting a half vector of the complete result for MPI_REDUCE. For MPI_REDUCE, the full complete results can be provided to one process in one final step in which the other process sends its half vector to the root. For MPI_ALLREDUCE, exchanging of half vector results can then be done in successive steps, 210 and 212, to ensure that full complete result vectors are available at every process. At step 210, remaining processes that belong to S0, except for process **2*r−2, send their half results to the non-participating processes of S0: process 4*i sends to process 4*i+2 and process 4*i+1 sends to process 4*i+3, i=0, 1, 2, . . . , r/2−2. Process i and i+1 of S1** exchange their results, i=2*r+1, 2*(r+1)+1, . . . , N'−2. Furthermore, process **2*r−2 sends its result to process 2*r, whereas process 2*r sends its result to process 2*r−1. Therefore, after step 210, each process in S0 has a half vector of the complete result; each process in S1 gets the full complete result. Processes in S0 then, at step 212, perform an exchange similar to what processes in S1 did in step 210** to get the complete final results.

FIGS. 4A through 4F illustrate the reduce operation when r is odd. As shown in FIG. 4A, processes 0 through 6 each have their respective A-D values. Initially, the first six processes exchange half vectors with their respective neighbor and perform local reduce operations. Process 6, which is process **2*r**, is idle at this stage.

Figure 4B:
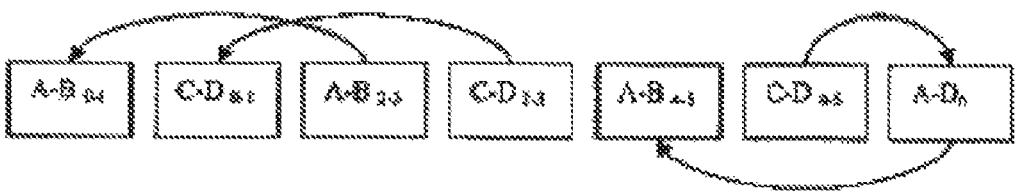
Figure 4C:
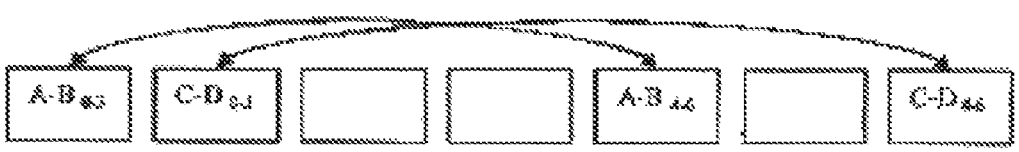
Figure 4D:
Figure 4E:
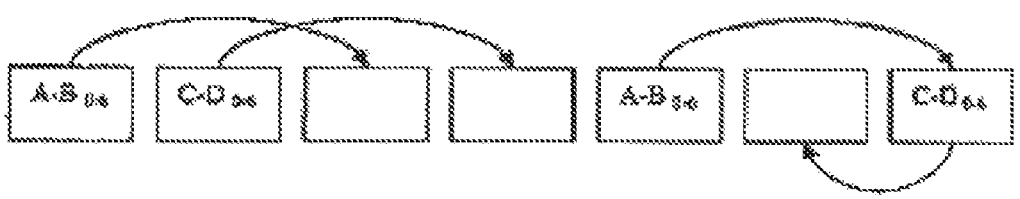

In FIG. 4B, the consolidation is performed and subgroups are re-aligned for further processing, whereby processes 0 through 3 are in subgroup S0 while processes 4-6 (i.e., processes **2*r−2, 2*r−1 and 2*r) are in the other subgroup. Process 2 sends its local reduce result to process 0 while process 3 sends its local reduce result to process 1. At the same time, process 5 sends its local reduce result to process 6 and process 6 sends its half vector (A-$B_6$) to process 4. Processes 0, 1, 4 and 6 perform local reduce operations. After this point, processes 2, 3 and 5 are non-participating until the end of the reduce operation. The remaining processes in the subset, including processes 0, 1, 4 and 6 as illustrated, exchange a quarter vector and perform local reduce operations at FIG. 4C whereby each remaining process has the complete result for one quarter vector (i.e., for one quarter of the data elements) as shown in FIG. 4D. Processes 0, 1, 4, and 6 then exchange results so that each will have complete results for a half vector, as shown in FIG. 4E. Processes 0 and 1 then send results to processes 2 and 3 respectively while process 4 sends results to process 6 and process 6 sends results to process 5**. As noted in the description above, a particular pairing of processes for exchange of results is not necessary-although performance can be optimized by minimizing exchange between non-contiguous processes.

Figure 4F:
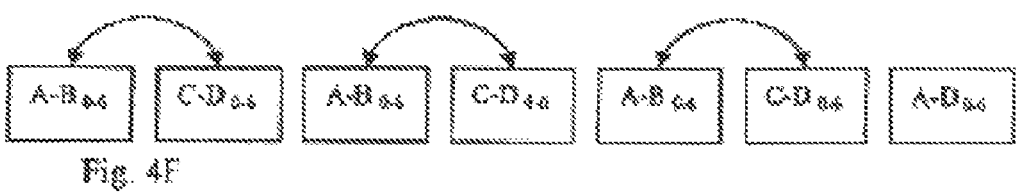

At this point, process 6 has complete results for the full vector but all other processes still only have complete results for a half vector. For an MPI_ALLREDUCE, as shown at FIG. 4F, processes 0 and 1, processes 2 and 3 and processes 4 and 5 exchange half vector results so that all original processes have complete vector results.

The benefit of the inventive approach is two-fold. In the prior art approach, local reduce results of the preparation step are sent by odd rank processes to even rank processes of S0, only to be again forwarded in the next step. Those unnecessary data forwards are avoided by the new approach. Further, processes of the S0 subgroup only send or receive a half vector instead of sending and receiving a full vector in the step following the preparation step. The current approach will put less of a burden on adaptors and alleviate the serialization at CPU and memory. Further, as detailed above, the last two steps for MPI_ALLREDUCE on N' processes reduce bandwidth requirements.

The prior art approach takes 2+2*log(N) steps, numbered from 0 to 2*log(N)+1. Before step 2*log(N), each of N/2 processes has the first half of the final complete reduce result, and the other N/2 processes ach has the second half of the final complete reduce result. Those processes can be referred to as subgroups S2 and S3. The other r processes (subgroup S4) were excluded after the first two steps and do not have any partial results. A one-to-one correspondence can be formed between processes of S2 and S3. With the prior art approach, the process of S2 and its partner in S3 exchange half of the final result during step 2*log(N). After this step, each N processes of S2 and S3 has the entire final reduce result. The first r of those N processes then sends the entire final result to processes of S4 in step 2*log(N)+1.

Under the presented approach as illustrated in FIGS. 3A-3F, when r is even, instead of exchanging half of the results between processes of S2 and S3 during step 2*log(N), the first r processes of S3 send their partial result to the first r processes of S2. Each of the r receivers of S2 sends data to one distinct process of S4 instead of to its partner in S3. Other processes work the same as in the prior art approach. Each process of S4 and each of the first r processes of S3 has only half of the final result, while all other processes have the entire final reduce results. In the final step, processes of S4 and the first r processes of S3 exchange the half results to get the entire final results. When r is odd, as illustrated in FIGS. 4A-4F, the first r−1 processes of the union of S2 and S3 send their results to the first r−1 processes of S4. The rth process of S2 and S3 sends its result to the (r+1)th process of S2 and S3 while the (r+1)th process sends its result to the last process of S4. The (r+1)th process of S2 and S3 now has the final result at the end of this step. In the last step, processes with half results exchange their results to get the entire result. This modification will effect another ½*L*β reduction in overall MPI_ALLREDUCE time.

On N' processes, with the presented approach, the cost of MPI_REDUCE is:

$$T=(2+2*\log(N))*\alpha+(1/2+2*(N-1)/N)*L*\beta+(\frac{1}{2}+(N-1)/N)*L*\gamma. \quad (3)$$

and MPI_ALLREDUCE time is:

$$T=(3+2*\log(N))*\alpha+(1+2*(N-1)/N)*L*\beta+(\frac{1}{2}+(N-1)/N)*L*\gamma. \quad (4)$$

Compared to the prior approaches, modeled by equations (1) and (2) above, the bandwidth requirement drops by more than 16% and 25%, respectively, for MPI_REDUCE and MPI_ALLREDUCE operations.

The invention has been described with reference to specific embodiments and processes for purposes of illustration and explanation and is not intended to be an exhaustive description. Modifications will be apparent to those of ordinary skill in the art and should be understood to be within the spirit and scope of the appended claims.

The invention claimed is:

1. A method implemented by processors in a parallel computing environment for performing large message global reduce operations at a plurality of N' processes each having at least one input data vector, comprising the steps of:
    dividing the N' processes into two subgroups, S0 and S1, where S0 comprises 2*r processes and S1 comprises N'−2*r processes, where r=N'−N, with N being the largest power of two less than N';
    performing paired data exchange and local reduce operations at the processes in S0, whereby r processes in S0 obtain partial reduce results of first half vectors and the other r processes in S0 obtain partial reduce results of second half vectors;
    consolidating the half vectors of the partial reduce result into a set of remaining processes, said set comprising N processes;
    wherein if r is an even integer, said consolidating comprises:
        sending the partial reduce results of the first half vector from r sending processes of S0 to r receiving processes of S0, where the sending and receiving processes have partial reduce results of a same half of the vector;
        performing local reduce operations at said receiving processes, whereby each receiving process has a half vector of partial reduce results; and
        performing paired exchange and local reduce operations at the processes of S1, whereby half processes in S1 have partial reduce results of the first half vector and the rest of the processes have partial reduce results of the second half vector;
    wherein if r is an odd integer, said consolidating comprises:
        dividing the S0 processes into r−1 sending processes, r−1 receiving processes and two other processes;
        sending half vectors of partial reduce results from r−1 sending processes of S0 to r−1 receiving processes of S0. said sending and receiving processes have partial reduce results of a same half vector;
        performing local reduce operations at said r−1 receiving processes,
    whereby each receiving process has a half vector of partial reduce results; and
        sending the half vector of partial reduce results from the first said other process of S0 to a process of S1;
        sending the other half vector of input data from the process of S1 to the second said other process of S0;
        performing local reduce operations at said process of S1 and said second other process of S0, whereby each process has partial reduce results of a half vector; and
        performing paired exchange and local reduce operations at the rest of the processes of S1, whereby half of the rest of the processes in S1 have partial reduce results of a first half vector and the other half of the processes in S1 have partial reduce results of a second half vector;
    performing successive recursive halving and recursive doubling at the set of remaining processes until each process in the set of remaining process has a half vector of the complete reduce results; and
    providing a full vector of the complete reduce results at every process.

2. The method of claim 1, wherein if r is an even integer, said providing a full vector of complete reduce results comprises the steps of:
    sending the half vector of the complete reduce results from the r receiving processes to the r sending processes;

performing paired exchanges at the processes of S0, whereby each process in S0 obtains a full vector of the complete reduce results; and performing paired exchange at the processes of S1, whereby each process in S1 obtains a full vector of the complete reduce results.

3. The method of claim 1 wherein if r is an odd integer, said providing a full vector of the complete reduce results comprises the steps of:

sending the half vector of the complete reduce results from the r−1 receiving processes of S0 to the r−1 sending processes of S0;

sending the half vector of complete reduce results from the second said other process of S0 in consolidating to the said process of S1 in consolidating, whereby the said process of S1 has a full vector of complete reduce results;

sending the other half vector of complete reduce results from the said process of S1 to the first said other process of S0;

performing paired exchanges at the processes of S0, whereby each process in S0 obtains a full vector of the complete reduce results; and performing paired exchange at the rest of the processes of S1, whereby each process obtains a full vector of,the complete reduce results.

4. A program storage device readable by machine and tangibly embodying a program of instructions executable by the machine to perform a method for performing large message global reduce operations at a plurality of N' processes each having at least one input data vector, wherein the method comprises the steps of:

dividing the N' processes into two subgroups, S0 and S1, where S0 comprises 2*r processes and S1 comprises N'−2*r processes, where r=N'−N, with N being the largest power of two less than N';

performing paired data exchange and local reduce operations at the processes in S0, whereby r processes in S0 obtain partial reduce results of first half vectors and the other r processes in S0 obtain partial reduce results of second half vectors;

consolidating the half vectors of the partial reduce result into a set of remaining processes, said set comprising N processes;

wherein if r is an even integer, said consolidating comprises;

sending the partial reduce results of the first half vector from r sending processes of S0 to r receiving processes of S0, where the sending and receiving processes have partial reduce results of a same half of the vector:

performing local reduce operations at said receiving processes, whereby each receiving process has a half vector of partial reduce results; and performing paired exchange and local reduce operations at the processes of S1, whereby half processes in S1 have partial reduce results of the first half vector and the rest of the processes have partial reduce results of the second half vector;

wherein if r is an odd integer, said consolidating comprises:

dividing the S0 processes into r−1 sending processes, r−1 receiving processes and two other processes;

sending half vectors of partial reduce results from r−1 sending processes of S0 to r−1 receiving processes of S0, said sending and receiving processes have partial reduce results of a same half vector;

performing local reduce operations at said r−1 receiving processes, whereby each receiving process has a half vector of partial reduce results; and sending the half vector of partial reduce results from the first said other process of S0 to a process of S1;

sending the other half vector of input data from the process of S1 to the second said other process of S0;

performing local reduce operations at said process of S1 and said second other process of S0, whereby each process has partial reduce results of a half vector; and performing paired exchange and local reduce operations at the rest of the processes of S1, whereby half of the rest of the processes in S1 have partial reduce results of a first half vector and the other half of the processes in S1 have partial reduce results of a second half vector;

performing successive recursive halving and recursive doubling at the set of remaining processes until each process in the set of remaining process has a half vector of the complete reduce result; and providing a full vector of the complete reduce result at every process.

5. The program storage device of claim 4 wherein if r is an even integer, said providing a full vector of complete reduce results comprises the steps of:

sending the half vector of the complete reduce results from the r receiving processes to the r sending.processes;

performing paired exchanges at the processes of S0, whereby each process in S0 obtains a full vector of the complete reduce results; and performing paired exchange at the processes of S1, whereby each process in S1 obtains a full vector of the complete reduce results.

6. The program storage device of claim 4 wherein if r is an odd integer, said providing a full vector of the complete reduce results comprises the steps of:

sending the half vector of the complete reduce results from the r−1 receiving processes of S0 to the r−1 sending processes of S0;

sending the half vector of complete reduce results from the second said other process of S0 in consolidating to the said process of S1 in consolidating, whereby the said process of S1 has a full vector of complete reduce results;

sending the other half vector of complete reduce results from the said process of S1 to the first said other process of S0;

performing paired exchanges at the processes of S0, whereby each process in S0 obtains a full vector of the complete reduce results; and performing paired exchange at the rest of the processes of S1, whereby each process obtains a full vector of the complete reduce results.

* * * * *